United States Patent
Osawa (10) Patent No.: US 10,647,162 B2
(45) Date of Patent: May 12, 2020

(54) PNEUMATIC TIRE

(71) Applicant: SUMITOMO RUBBER INDUSTRIES, LTD., Kobe-shi (JP)

(72) Inventor: Takuya Osawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 457 days.

(21) Appl. No.: 15/409,675

(22) Filed: Jan. 19, 2017

(65) Prior Publication Data

US 2017/0210177 A1    Jul. 27, 2017

(30) Foreign Application Priority Data

Jan. 21, 2016    (JP) .................................. 2016-009931

(51) Int. Cl.
*B60C 11/12* (2006.01)
*B60C 11/03* (2006.01)
*B60C 11/04* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC . B60C 11/1236; B60C 11/0304; B60C 11/04; B60C 11/0306; B60C 2011/0341;
(Continued)

(56) References Cited

U.S. PATENT DOCUMENTS

2005/0183807 A1* 8/2005 Hildebrand ......... B60C 11/0306
152/209.2
2013/0092304 A1    4/2013 Murata
(Continued)

FOREIGN PATENT DOCUMENTS

JP    2011-178213 A    9/2011
JP    2014-148219 A    8/2014
(Continued)

OTHER PUBLICATIONS

JP 2015-209189, English language machine translation [epo.org]. (Year: 2015).*
(Continued)

*Primary Examiner* — Eric Hug
(74) *Attorney, Agent, or Firm* — Oblon, McClelland, Maier & Neustadt, L.L.P.

(57) ABSTRACT

A pneumatic tire includes a tread having main grooves extending in circumferential direction, and land portions partitioned by the main grooves. The main grooves include a pair of shoulder main grooves on tread edge sides, the land portions include a pair of shoulder ribs between the shoulder grooves and tread edges, rib has shoulder lug grooves extending from tread edge to axial direction inner side and having inner end terminated without reaching shoulder groove, and shoulder sipes extending from shoulder groove to axial direction outer side between adjacent lug grooves in the circumferential direction and having outer end terminated without reaching tread edge, and the ribs are forming such that circumferential direction length of first region between inner ends of sipe and adjacent lug groove is in range of 2 to 4 times circumferential direction length of second region between inner ends of sipe and the other adjacent lug groove.

20 Claims, 3 Drawing Sheets

(52) U.S. Cl.
CPC ............ B60C 11/0311 (2013.01); B60C 11/04 (2013.01); B60C 11/12 (2013.01); *B60C 2011/039* (2013.01); *B60C 2011/0341* (2013.01); *B60C 2011/0381* (2013.01); *B60C 2011/0386* (2013.01)

(58) Field of Classification Search
CPC ..... B60C 2011/0381; B60C 2011/0386; B60C 11/0311; B60C 2011/039; B60C 2011/1254
USPC .................................. 152/209.8, 209.16, 901
See application file for complete search history.

(56) References Cited

U.S. PATENT DOCUMENTS

| | | | |
|---|---|---|---|
| 2013/0167997 A1* | 7/2013 | Hayashi | B60C 11/04 152/209.18 |
| 2014/0138000 A1 | 5/2014 | Inoue | |
| 2014/0283966 A1* | 9/2014 | Horiguchi | B60C 11/005 152/209.18 |
| 2016/0082780 A1* | 3/2016 | Nagahara | B60C 11/042 152/209.18 |

FOREIGN PATENT DOCUMENTS

| | | | | |
|---|---|---|---|---|
| JP | 2015-209189 | * | 11/2015 | ............. B60C 11/12 |
| JP | 2015-209189 A | | 11/2015 | |

OTHER PUBLICATIONS

Extended European Search Report dated Jun. 29, 2017 in Patent Application No. 16206911.6.

* cited by examiner

PNEUMATIC TIRE

CROSS-REFERENCE TO RELATED APPLICATIONS

The present application is based upon and claims the benefit of priority to Japanese Patent Application No. 2016-009931, filed Jan. 21, 2016, the entire contents of which are incorporated herein by reference.

BACKGROUND OF THE INVENTION

Field of the Invention

The present invention relates to a pneumatic tire that allows steering stability and riding comfort to be improved in a well-balanced manner.

Description of Background Art

For example, Japanese Patent Laid-Open Publication No. 2015-209189 describes a pneumatic tire that has shoulder lug grooves and shoulder sipes in a pair of shoulder ribs. The entire contents of this publication are incorporated herein by reference.

SUMMARY OF THE INVENTION

According to one aspect of the present invention, a pneumatic tire includes a tread having main grooves extending in a tire circumferential direction, and land portions partitioned by the main grooves. The main grooves include a pair of shoulder main grooves formed on tread edge sides, respectively, the land portions include a pair of shoulder ribs formed between the shoulder main grooves and tread edges, respectively, each of the shoulder ribs has shoulder lug grooves such that each of the shoulder lug grooves is extending from a respective one of the tread edges to a tire axial direction inner side and has an inner end terminated without reaching a respective one of the shoulder main grooves, and shoulder sipes such that each of the shoulder sipes is extending from a respective one of the shoulder main grooves to a tire axial direction outer side between adjacent shoulder lug grooves in the tire circumferential direction and has an outer end terminated without reaching a respective one of the tread edges, and the shoulder ribs are formed such that a tire circumferential direction length of a first region between an inner end of each of the shoulder sipes and an inner end of an adjacent shoulder lug groove is in a range of 2 times to 4 times a tire circumferential direction length of a second region between the inner end of each of the shoulder sipes and an inner end of the other adjacent shoulder lug groove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
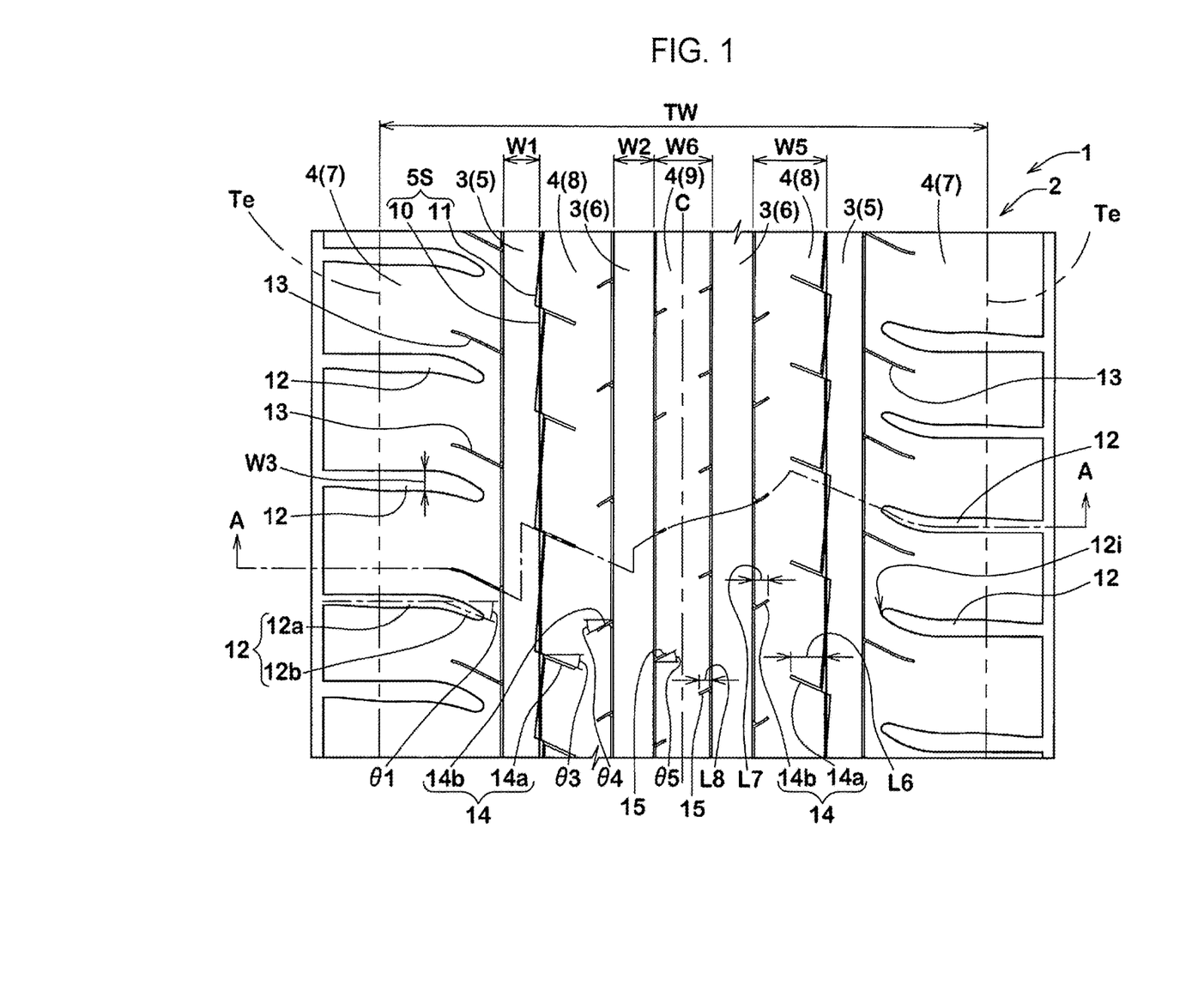
FIG. 1 is a developed view illustrating a pneumatic tire according to an embodiment of the present invention.
Figure 2:
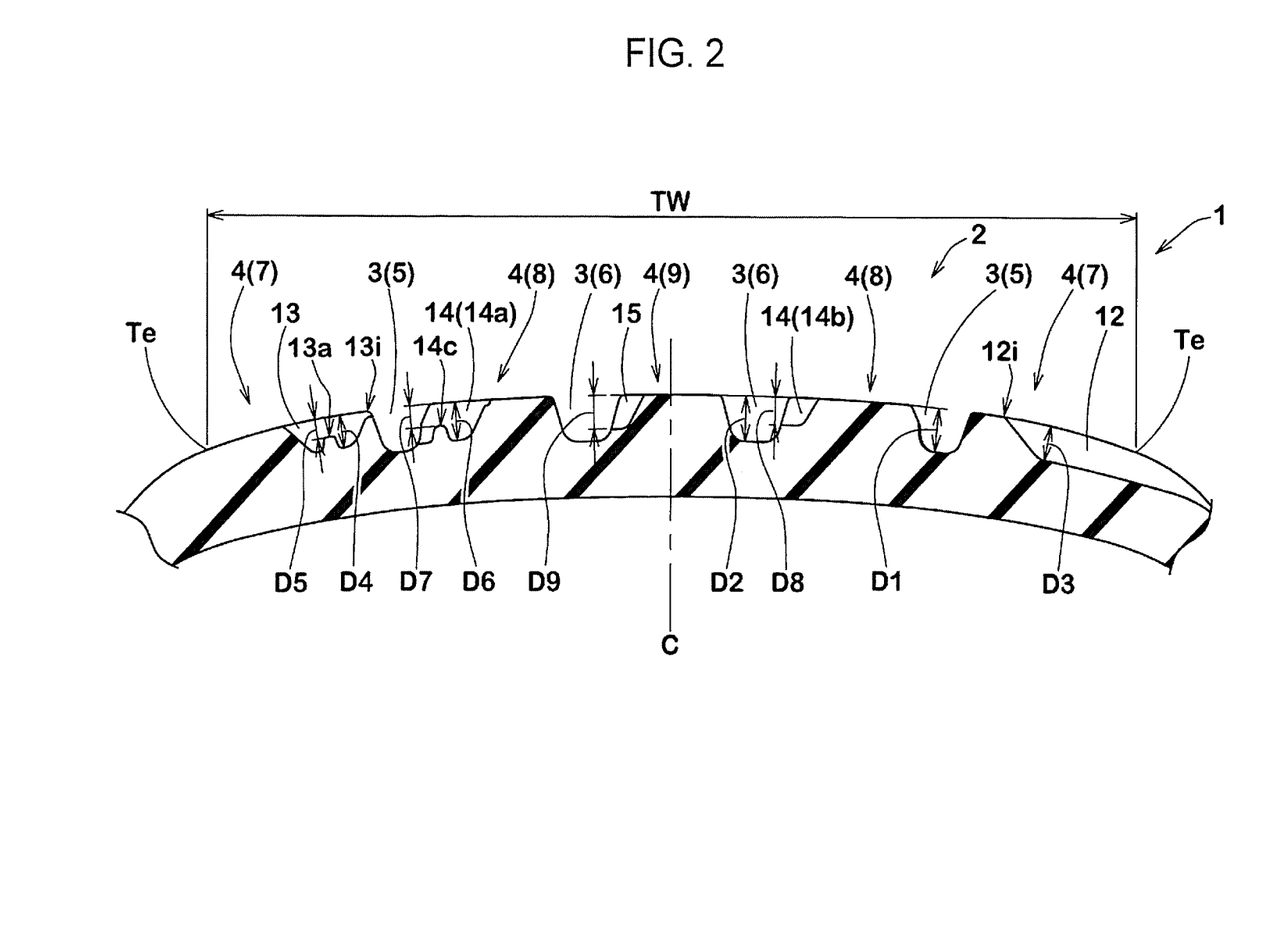
FIG. 2 is a cross-sectional view along a line A-A of FIG. 1.

FIG. 1 is a developed view of a tread part 2 of a pneumatic tire 1 of the present embodiment. FIG. 2 is a cross-sectional view along a line A-A of FIG. 1. As illustrated in FIGS. 1 and 2, the pneumatic tire 1 of the present embodiment includes, in the tread part 2, multiple main grooves 3 that extend along a tire circumferential direction and multiple land portions 4 that are partitioned by the main grooves 3, and is embodied, for example, as a steel radial tire for a passenger car.

The main grooves 3 include a pair of shoulder main grooves 5 that are respectively formed on tread edge (Te) sides and a pair of crown main grooves 6 that are respectively formed on tire axial direction inner sides of the shoulder main grooves 5. The land portions 4 include a pair of shoulder ribs 7, a pair of middle ribs 8, and a crown rib 9. The shoulder ribs 7 are respectively formed between the shoulder main grooves 5 and the tread edges (Te). The middle ribs 8 are respectively formed on tire axial direction inner sides of the shoulder main grooves 5 and tire axial direction outer sides of the crown main grooves 6. The crown rib 9 is formed between the pair of the crown main grooves 6.

Here, the term "tread edge" (Te) refers to a tire axial direction outermost edge of a ground contact surface when a normal load is loaded to a tire in a normal state and the tire is grounded on a flat surface at a camber angle of 0 degree. A tire axial direction distance between the tread edges (Te) is defined as a tread ground contact width (TW).

The term "normal state" refers to a no-load state in which the pneumatic tire 1 is mounted to a normal rim (not illustrated in the drawings) and is filled with air at a normal pressure. In the present specification, unless otherwise specified, values of dimensions of the parts of the pneumatic tire 1 are values measured in the normal state. Further, unless otherwise specified, a groove width of each of the grooves is measured in a direction orthogonal to a longitudinal direction of the groove.

The term "normal rim" refers to a rim for which standards are set for each tire in a system of standards that includes standards on which the pneumatic tire 1 is based. For example, the term "normal rim" refers to a "Standard Rim" in the JATMA standards, a "Design Rim" in the TRA standards, or a "Measuring Rim" in the ETRTO standards.

The term "normal pressure" refers to an air pressure for which standards are set for each tire in a system of standards that includes the standards on which the pneumatic tire 1 is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the pneumatic tire 1 is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

The shoulder main grooves 5 and the crown main grooves 6 of the present embodiment are straight grooves that linearly extend in the tire circumferential direction. Such straight grooves have small drainage resistances and can smoothly discharge a water film between the tread part 2 and a road surface in the tire circumferential direction during straight running and turning and thus can improve steering stability on a wet road surface.

In the present embodiment, a groove width (W1) of each of the shoulder main grooves 5 and a groove width (W2) of each of the crown main grooves 6 are preferably each set to 3-8% of the tread ground contact width (TW). A groove depth (D1) of each of the shoulder main grooves 5 and a groove depth (D2) of each of the crown main grooves 6 are preferably each set to 3-6% of the tread ground contact width (TW). Such shoulder main grooves 5 and crown main grooves 6 can improve steering stability on a dry road surface and on a wet road surface in a well-balanced manner.

As illustrated in FIG. 1, a groove wall surface (5S) on a tire axial direction inner side of each of the shoulder main grooves 5 includes, for example, flat portions 10 that extend along the circumferential direction and V-shaped projecting portions 11 that each project in a small height toward an inner side of the groove. It is desirable that the flat portions 10 and the V-shaped projecting portions 11 be alternately provided along the tire circumferential direction. Such V-shaped projecting portions 11 suppress falling of the groove wall surface (5S), and further increase rigidity of the middle ribs 8 while maintaining high drainage performance, and thus can further improve steering stability.

Each of the shoulder ribs 7 of the present embodiment has multiple shoulder lug grooves 12 and multiple shoulder sipes 13, each of the shoulder lug grooves 12 extending from one of the tread edges (Te) to a tire axial direction inner side, and each of the shoulder sipes 13 extending from one of the shoulder main grooves 5 to a tire axial direction outer side between shoulder lug grooves 12 that are adjacent to each other in the tire circumferential direction. A tire axial direction inner end (12i) of each of the shoulder lug grooves 12 is terminated without reaching one of the shoulder main grooves 5. A tire axial direction outer end of each of the shoulder sipes 13 is terminated without reaching one of the tread edges (Te). Such shoulder ribs 7 can ensure a high rigidity while maintaining good drainage performance and thus can achieve high steering stability.

Figure 3:
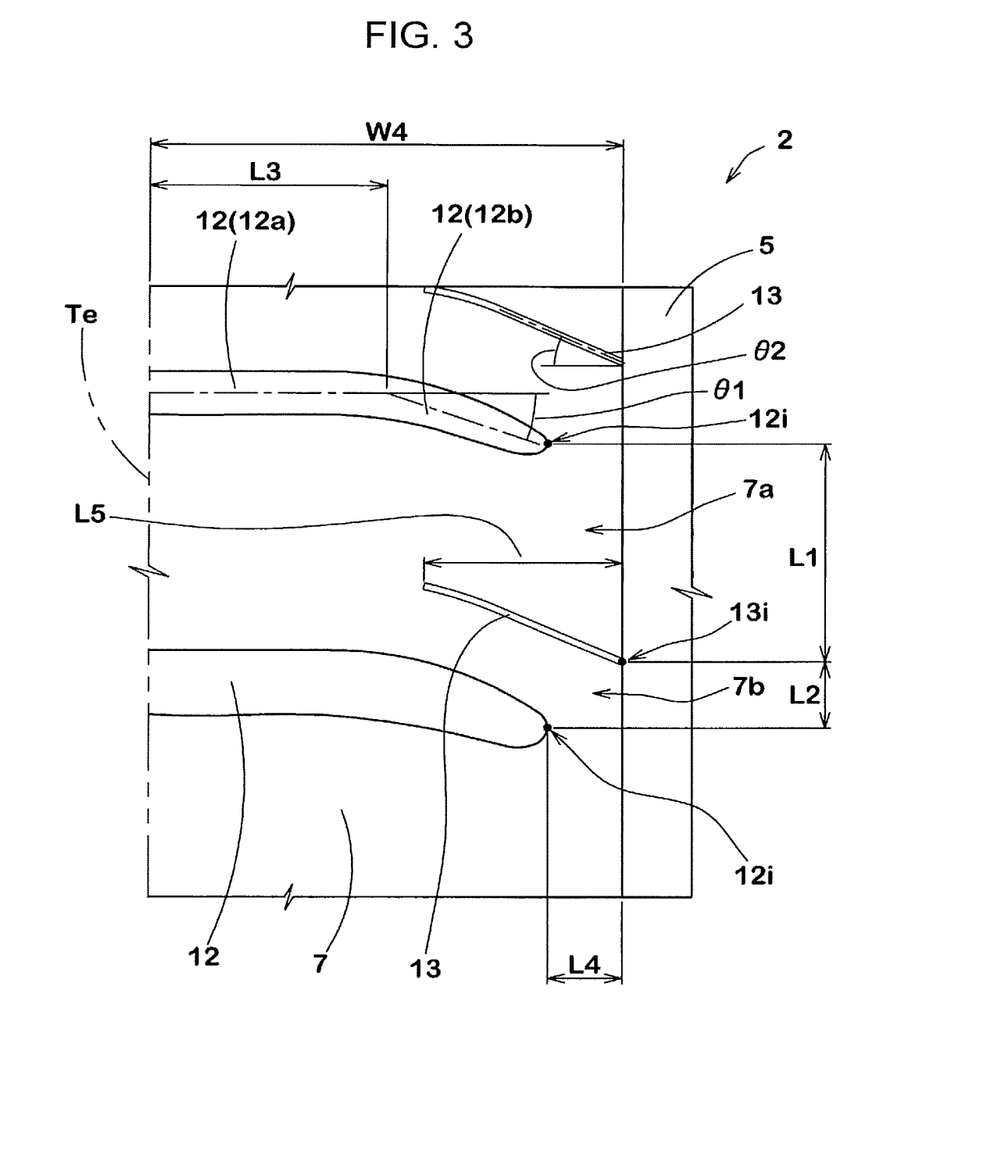
FIG. 3 is a partial enlarged view of a tread part.

FIG. 3 illustrates a partial enlarged view of the tread part 2. As illustrated in FIG. 3, each of the shoulder ribs 7 is divided into a first region (7a) and a second region (7b) in the tire circumferential direction, the first region (7a) being between an inner end (13i) of each of the shoulder sipes 13 and an inner end (12i) of an adjacent shoulder lug groove 12, and the second region (7b) being between the inner end (13i) of each of the shoulder sipes 13 and an inner end (12i) of the other adjacent shoulder lug groove 12.

In the present embodiment, a tire circumferential direction length (L1) of the first region (7a) is 2-4 times a tire circumferential direction length (L2) of the second region (7b). The shoulder ribs 7 having such shoulder sipes 13 can relax an impact from a road surface while maintaining rigidity and thus can improve riding comfort while maintaining steering stability. When the length (L1) is smaller than 2 times the length (L2), there is a risk that the effect of relaxing an impact from a road surface is reduced and riding comfort is not improved. When the length (L1) is larger than 4 times the length (L2), there is a risk that rigidity of a portion near the shoulder lug grooves 12 is lowered and steering stability is decreased.

As illustrated in FIGS. 1 and 2, a maximum groove width (W3) of each of the shoulder lug grooves 12 is preferably set to 2-4% of the tread ground contact width (TW). A maximum groove depth (D3) of each of the shoulder lug grooves 12 is preferably set to 2-5% of the tread ground contact width (TW). Such shoulder lug grooves 12 can smoothly discharge a water film between the shoulder ribs 7 and a road surface to the tread edge (Te) sides and thus can improve steering stability on a wet road surface.

As illustrated in FIG. 3, each of the shoulder lug grooves 12 of the present embodiment has an axial-direction portion (12a) that extends along the tire axial direction and an inclined portion (12b) that is inclined in one direction with respect to the tire axial direction. It is preferable that the axial-direction portion (12a) of each of the shoulder lug grooves 12 extend along the tire axial direction at an angle of 2 degrees or less with respect to the tire axial direction. Further, it is preferable that the inclined portion (12b) be inclined at an angle ($\theta 1$) of 10-50 degrees with respect to the tire axial direction.

A tire axial direction length (L3) of the axial-direction portion (12a) of each of the shoulder lug grooves 12 is preferably 55%-65% of a width (W4) of each of the shoulder ribs 7. It is desirable that the axial-direction portion (12a) of each of the shoulder lug grooves 12 have a substantially constant groove width. Such an axial-direction portion (12a) has a low drainage resistance and can more smoothly discharge a water film between the shoulder ribs 7 and a road surface to the tread edge (Te) side during turning.

It is desirable that the inclined portion (12b) of each of the shoulder lug grooves 12 have a groove width that is gradually reduced toward the inner end (12i). A tire axial direction distance (L4) between the inner end (12i) of each of the shoulder lug grooves 12 and the shoulder main groove 5 is preferably 7%-12% of the width (W4) of each of the shoulder ribs 7. Such an inclined portion (12b) can increase rigidity of a portion of each of the shoulder ribs 7 near the inner end (12i) and thus can improve steering stability.

Each of the shoulder sipes 13 of the present embodiment is inclined in the same direction as the inclined portion (12b) of each of the shoulder lug grooves 12 with respect to the tire axial direction. It is preferable that each of the shoulder sipes 13 be inclined at an angle ($\theta 2$) of 10-40 degrees with respect to the tire axial direction. A difference between the angle ($\theta 2$) of each of the shoulder sipes 13 with respect to the tire axial direction and the angle ($\theta 1$) of the inclined portion (12b) with respect to the tire axial direction is preferably 10 degrees or less. Such shoulder sipes 13 can maintain rigidity of the shoulder ribs 7 in a proper range and thus can improve steering stability and riding comfort in a well-balanced manner.

A tire axial direction length (L5) of each of the shoulder sipes 13 is preferably 20%-50% of the width (W4) of each of the shoulder ribs 7. When the length (L5) is smaller than 20% of the width (W4), there is a risk that the effect of relaxing an impact from a road surface is reduced and riding comfort is not improved. When the length (L5) is larger than 50% of the width (W4), there is a risk that the rigidity of the shoulder ribs 7 is lowered and steering stability is decreased.

As illustrated in FIG. 2, a depth of each of the shoulder sipes 13 is gradually increased, for example, from the tire axial direction inner end (13i) toward a tire axial direction outer side, and forms a maximum depth (D4). The maximum depth (D4) is preferably 65%-75% of the groove depth (D1) of each of the shoulder main grooves 5.

It is desirable that each of the shoulder sipes 13 have a shallow portion (13a) that projects from a bottom portion of each of the shoulder sipes 13 to a tire radial direction outer side and is shallower than the maximum depth (D4). A depth (D5) of the shallow portion (13a) of each of the shoulder sipes 13 is preferably 50%-65% of the maximum depth (D4) of each of the shoulder sipes 13. Such shallow portions (13a) can partially increase the rigidity of the shoulder ribs 7 and thus can further improve steering stability while maintaining riding comfort.

As illustrated in FIG. 1, each of the middle ribs 8 of the present embodiment has multiple middle sipes 14 that are each terminated in each of the middle ribs 8. The middle sipes 14 include multiple outer middle sipes (14a) and multiple inner middle sipes (14b), each of the outer middle sipes (14a) extending from one of the shoulder main grooves 5 to a tire axial direction inner side, and each of the inner middle sipes (14b) extending from one of the crown main grooves 6 to a tire axial direction outer side between outer middle sipes (14a) that are adjacent to each other in the tire circumferential direction. An inner end of each of the outer middle sipes (14a) is terminated in each of the middle ribs 8, and an outer end of each of the inner middle sipes (14b) is terminated in each of the middle ribs 8.

Each of the outer middle sipes (14a) of the middle sipes 14 of the present embodiment is inclined in the same direction as the inclined portion (12b) of each of the shoulder lug grooves 12 with respect to the tire axial direction. It is preferable that each of the outer middle sipes (14a) be inclined at an angle (θ3) of 10-40 degrees with respect to the tire axial direction. A difference between the angle (θ3) of each of the outer middle sipes (14a) with respect to the tire axial direction and the angle (θ1) of the inclined portion (12b) is preferably 10 degrees or less. It is desirable that the outer middle sipes (14a) are respectively positioned substantially on extension lines of the inclined portions (12b). Such outer middle sipes (14a) can maintain rigidity of the middle ribs 8 in a proper range, and improve steering stability and riding comfort in a well-balanced manner.

A tire axial direction length (L6) of each of the outer middle sipes (14a) is preferably 35%-70% of a width (W5) of each of the middle ribs 8. When the length (L6) is smaller than 35% of the width (W5), there is a risk that the rigidity of the middle ribs 8 becomes high and riding comfort is not improved. When the length (L6) is larger than 70% of the width (W5), there is a risk that the rigidity of the middle ribs 8 is lowered and steering stability is not improved.

As illustrated in FIG. 2, a depth of each of the outer middle sipes (14a) is gradually increased, for example, from a tire axial direction inner end toward a tire axial direction outer side, and forms a maximum depth (D6). The maximum depth (D6) is preferably 80%-90% of the groove depth (D1) of each of the shoulder main grooves 5.

It is desirable that each of the outer middle sipes (14a) have a shallow portion (14c) near the shoulder main groove 5, the shallow portion (14c) projecting from a bottom portion of each of the outer middle sipes (14a) to a tire radial direction outer side and being shallower than the maximum depth (D6). A depth (D7) of the shallow portion (14c) of each of the outer middle sipes (14a) is preferably 50%-65% of the maximum depth (D6) of each of the outer middle sipes (14a). Such shallow portions (14c) can surely increase rigidity of outer edge sides of the middle ribs 8 of which a ground contact pressure becomes relatively large during turning, and thus can improve steering stability.

As illustrated in FIGS. 1 and 2, the inner middle sipes (14b) of the middle sipes 14 of the present embodiment are inclined in a direction opposite to that of the outer middle sipes (14a) with respect to the tire axial direction. It is preferable that each of the inner middle sipes (14b) be inclined at an angle (θ4) of 10-50 degrees with respect to the tire axial direction. A tire axial direction length (L7) of each of the inner middle sipes (14b) is preferably 15%-40% of a width (W5) of each of the middle ribs 8. When the length (L7) is smaller than 15% of the width (W5), there is a risk that the rigidity of the middle ribs 8 becomes high and riding comfort is not improved. When the length (L7) is larger than 40% of the width (W5), there is a risk that the rigidity of the middle ribs 8 is lowered and steering stability is not improved.

A depth of each of the inner middle sipes (14b) is gradually increased, for example, from a tire axial direction outer end toward a tire axial direction inner side, and forms a maximum depth (D8). The maximum depth (D8) is preferably 55%-65% of the groove depth (D1) of each of the shoulder main grooves 5.

The crown rib 9 of the present embodiment has multiple crown sipes 15, each of the crown sipes 15 extending from one of the crown main grooves 6 to a tire axial direction inner side and an inner end of each of the crown sipes 15 being terminated in the crown rib 9. It is desirable that each of the crown sipes 15 be terminated without reaching a tire equator (C). The crown sipes 15, for example, are alternately formed in the tire circumferential direction on both edges of the crown rib 9.

The crown sipes 15 of the present embodiment are inclined in the same direction as the inner middle sipes (14b) with respect to the tire axial direction. It is preferable that each of the crown sipes 15 be inclined at an angle (θ5) of 10-50 degrees with respect to the tire axial direction. A difference between the angle (θ5) of each of the crown sipes 15 with respect to the tire axial direction and the angle (θ4) of each of the inner middle sipes (14b) with respect to the tire axial direction is preferably 10 degrees or less. Such crown sipes 15 can maintain rigidity of the crown rib 9 in a proper range, and improve steering stability and riding comfort in a well-balanced manner.

A tire axial direction length (L8) of each of the crown sipes 15 is preferably 25%-35% of a width (W6) of the crown rib 9. When the length (L8) is smaller than 25% of the width (W6), there is a risk that the rigidity of the crown rib 9 becomes high and riding comfort is not improved. When the length (L8) is larger than 35% of the width (W6), there is a risk that the rigidity of the crown rib 9 is lowered and steering stability is not improved.

A depth of each of the crown sipes 15 is gradually increased, for example, from a tire axial direction inner end toward a tire axial direction outer side, and forms a maximum depth (D9). The maximum depth (D9) is preferably 70%-80% of the groove depth (D1) of each of the shoulder main grooves 5.

In the above, an embodiment of the present invention is described in detail. However, the present invention is not limited to the above-described embodiment and can be embodied in various modified foul's.

For example, in the above-described embodiment, the main grooves 3 are straight grooves. However, it is also possible that the main grooves 3 are zigzag grooves. Further, the land portions 4 are ribs. However, it is also possible that the middle ribs 8 and the crown rib 9 are each divided into blocks by sipes extending through the ribs.

EXAMPLES

Pneumatic tires (size: 225/55R17) each having the tread pattern of FIG. 1 as a basic pattern are manufactured based on specifications shown in Table 1. The prototyped tires are mounted to all wheels of a test vehicle, and steering stability and riding comfort are tested.

Common specifications and a test method of the tests are as follows.

Rim size: 17×7J
Tire internal pressure: 230 kPa
Test vehicle: 1200 cc passenger car Steering Stability The test vehicle to which the prototyped tires are mounted is driven by five test drivers to run on a test course having a dry road surface, and steering stability is evaluated based on sensory evaluation by each of the test drivers based on initial responsiveness and a steering holding force during testing. As a result of the evaluation, a sum of evaluation values of the drivers is expressed as an index number with a result of Comparative Example 1 as 100. A larger index number indicates a better steering stability.

Riding Comfort

The test vehicle to which the prototyped tires are mounted is driven by five test drivers to run on a test course having a dry road surface, and riding comfort is evaluated based on sensory evaluation by each of the test drivers based on feeling of rigidity during testing. As a result of the evaluation, a sum of evaluation values of the drivers is expressed as an index number with a result of the comparative example 1 as 100. A larger index number indicates a better riding comfort.

The results of the tests are shown in Table 1.

A pneumatic tire according to an embodiment of the present invention allows steering stability and riding comfort to be improved in a well-balanced manner based on forming shoulder sipes at specific positions between shoulder lug grooves.

A pneumatic tire according to an embodiment of the present invention includes, in a tread part, multiple main grooves that extend in a tire circumferential direction, and multiple land portions that are partitioned by the main grooves. The main grooves include a pair of shoulder main grooves that are respectively formed on tread edge sides. The land portions include a pair of shoulder ribs that are respectively formed between the shoulder main grooves and the tread edges. Each of the shoulder ribs has multiple shoulder lug grooves and multiple shoulder sipes, each of the shoulder lug grooves extending from one of the tread edges to a tire axial direction inner side and an inner end of each of the shoulder lug grooves being terminated without reaching one of the shoulder main grooves; and each of the shoulder sipes extending from one of the shoulder main grooves to a tire axial direction outer side between shoulder lug grooves that are adjacent to each other in the tire circumferential direction and an outer end of each of the shoulder sipes being terminated without reaching one of the tread edges. A tire circumferential direction length of a first region between an inner end of each of the shoulder sipes and an inner end of an adjacent shoulder lug groove is 2-4 times a tire circumferential direction length of a second Table 1

|  | Comparative Example 1 | Example 1 | Example 2 | Example 3 | Example 4 | Example 5 | Example 6 | Example 7 | Example 8 | Comparative Example 2 |
|---|---|---|---|---|---|---|---|---|---|---|
| Position of Shoulder Sipes (L1/L2) (times) | 1 | 2 | 3 | 3 | 3 | 3 | 3 | 3 | 4 | 5 |
| Length of Shoulder Sipes (L5/W4) (%) | 30 | 30 | 30 | 10 | 60 | 30 | 30 | 30 | 30 | 30 |
| Angle Difference between Shoulder Sipe and Inclined Portion (θ1-θ2) (degrees) | 5 | 5 | 5 | 5 | 5 | 25 | 5 | 5 | 5 | 5 |
| Length of Axial-Direction Portion (L3/W4) (%) | 60 | 60 | 60 | 60 | 60 | 60 | 50 | 70 | 60 | 60 |
| Steering Stability (Index Number) | 100 | 105 | 115 | 105 | 110 | 100 | 105 | 105 | 100 | 85 |
| Riding Comfort (Index Number) | 100 | 115 | 125 | 110 | 110 | 110 | 105 | 110 | 110 | 100 |

Based on the results of the tests, it can be confirmed that the tires of the examples allow steering stability and riding comfort to be improved in a well-balanced manner as compared to the comparative example.

In order to improve riding comfort, it may be effective to lower rigidity of a tread part of a pneumatic tire to allow an impact from a road surface to be absorbed by the tread part (tread rubber). However, when the rigidity of the tread part is lowered, there is a tendency that a cornering power during steering is reduced and steering stability is decreased.

Attempts have been made to achieve both riding comfort and steering stability by providing sipes in a tread part of a pneumatic tire. For example, Japanese Patent Laid-Open Publication No. 2015-209189 has proposed a pneumatic tire that has shoulder lug grooves and shoulder sipes in a pair of shoulder ribs.

However, although the above-described pneumatic tire of Japanese Patent Laid-Open Publication No. 2015-209189 allows certain improvement in steering stability to be achieved, rigidity of a tread part of the pneumatic tire is high and further improvement in riding comfort is necessary.

region between the inner end of each of the shoulder sipes and an inner end of the other adjacent shoulder lug groove.

In a pneumatic tire according to an embodiment of the present invention, it is desirable that a tire axial direction length of each of the shoulder sipes be 20%-50% of a width of each of the shoulder ribs.

In a pneumatic tire according to an embodiment of the present invention, it is desirable that each of the shoulder lug grooves have an axial-direction portion that extends along a tire axial direction, and an inclined portion that is inclined in one direction with respect to the tire axial direction.

In a pneumatic tire according to an embodiment of the present invention, it is desirable that each of the shoulder sipes be inclined in the same direction as the inclined portion with respect to the tire axial direction, and a difference between an angle of each of the shoulder sipes with respect to the tire axial direction and an angle of the inclined portion with respect to the tire axial direction be 10 degrees or less.

In a pneumatic tire according to an embodiment of the present invention, it is desirable that the land portions further include middle ribs that are respectively formed on tire axial direction inner sides of the shoulder main grooves; each of the middle ribs have multiple middle sipes, each of the middle sipes extending from one of the shoulder main grooves to a tire axial direction inner side, and an inner end of each of the middle sipes being terminated in each of the middle ribs; each of the middle sipes be inclined in the same direction as the inclined portion with respect to the tire axial direction; and a difference between an angle of each of the middle sipes with respect to the tire axial direction and the angle of the inclined portion with respect to the tire axial direction be 10 degrees or less.

In a pneumatic tire according to an embodiment of the present invention, it is desirable that the middle sipes be respectively positioned on extension lines of the inclined portions.

In a pneumatic tire according to an embodiment of the present invention, it is desirable that a tire axial direction length of the axial-direction portion be 55%-65% of a width of each of the shoulder ribs.

In a pneumatic tire according to an embodiment of the present invention, it is desirable that a distance between the inner end of each of the shoulder lug grooves and the shoulder main groove be 7%-12% of a width of the shoulder rib.

In a pneumatic tire according to an embodiment of the present invention, each of the shoulder ribs has multiple shoulder lug grooves and multiple shoulder sipes, each of the shoulder lug grooves extending from one of the tread edges to a tire axial direction inner side and an inner end of each of the shoulder lug grooves being terminated without reaching one of the shoulder main grooves, and each of the shoulder sipes extending from one of the shoulder main grooves to a tire axial direction outer side between shoulder lug grooves that are adjacent to each other in the tire circumferential direction and an outer end of each of the shoulder sipes being terminated without reaching one of the tread edges. Such shoulder ribs can achieve high steering stability.

Further, a tire circumferential direction length between an inner end of each of the shoulder sipes and an inner end of an adjacent shoulder lug groove is 2-4 times a tire circumferential direction length between the inner end of each of the shoulder sipes and an inner end of the other adjacent shoulder lug groove. Such shoulder sipes can improve riding comfort while maintaining steering stability.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a tread having a plurality of main grooves extending in a tire circumferential direction, and a plurality of land portions partitioned by the main grooves,
wherein the plurality of main grooves includes a pair of shoulder main grooves formed on tread edge sides, respectively, the plurality of land portions includes a pair of shoulder ribs formed between the shoulder main grooves and tread edges, respectively, each of the shoulder ribs has a plurality of shoulder lug grooves formed such that each of the shoulder lug grooves is extending from a respective one of the tread edges to a tire axial direction inner side and has an inner end terminated without reaching a respective one of the shoulder main grooves, and a plurality of shoulder sipes formed such that each of the shoulder sipes is extending from a respective one of the shoulder main grooves to a tire axial direction outer side between adjacent shoulder lug grooves in the tire circumferential direction and has an outer end terminated without reaching a respective one of the tread edges, the plurality of shoulder ribs is formed such that the shoulder lug grooves and the shoulder sipes are formed alternately with respect to each other and that a tire circumferential direction length of a first region between an inner end of each of the shoulder sipes and an inner end of an adjacent shoulder lug groove is in a range of 2 times to 4 times a tire circumferential direction length of a second region between the inner end of each of the shoulder sipes and an inner end of the other adjacent shoulder lug groove, and the plurality of shoulder ribs is formed such that each of the shoulder sipes has a tire axial direction length in a range of 20% to 50% of a width of each of the shoulder ribs.

2. The pneumatic tire according to claim 1, wherein the plurality of shoulder ribs is formed such that each of the shoulder lug grooves has an axial-direction portion extending along a tire axial direction, and an inclined portion inclined in one direction with respect to the tire axial direction.

3. The pneumatic tire according to claim 2, wherein the plurality of shoulder ribs is formed such that each of the shoulder sipes is inclined in the same direction as the inclined portion with respect to the tire axial direction, and that a difference between an angle of each of the shoulder sipes with respect to the tire axial direction and an angle of the inclined portion with respect to the tire axial direction is 10 degrees or less.

4. The pneumatic tire according to claim 2, wherein the plurality of land portions includes a plurality of middle ribs formed on tire axial direction inner sides of the shoulder main grooves, respectively, such that each of the middle ribs has a plurality of middle sipes extending from a respective one of the shoulder main grooves to a tire axial direction inner side, and the plurality of middle sipes is formed such that each of the middle sipes has an inner end terminated in a respect one of the middle ribs and is inclined in the same direction as the inclined portion with respect to the tire axial direction, and that a difference between an angle of each of the middle sipes with respect to the tire axial direction and the angle of the inclined portion with respect to the tire axial direction is 10 degrees or less.

5. The pneumatic tire according to claim 4, wherein the plurality of middle ribs is formed such that the middle sipes are positioned on extension lines of the inclined portions, respectively.

6. The pneumatic tire according to claim 2, wherein the plurality of shoulder ribs is formed such that each of the shoulder lug grooves has a tire axial direction length of the axial-direction portion in a range of 55% to 65% of the width of each of the shoulder ribs.

7. A pneumatic tire, comprising:
a tread having a plurality of main grooves extending in a tire circumferential direction, and a plurality of land portions partitioned by the main grooves,
wherein the plurality of main grooves includes a pair of shoulder main grooves formed on tread edge sides, respectively, the plurality of land portions includes a pair of shoulder ribs formed between the shoulder main grooves and tread edges, respectively, each of the shoulder ribs has a plurality of shoulder lug grooves formed such that each of the shoulder lug grooves is extending from a respective one of the tread edges to a tire axial direction inner side and has an inner end terminated without reaching a respective one of the shoulder main grooves, and a plurality of shoulder sipes formed such that each of the shoulder sipes is extending from a respective one of the shoulder main grooves to a tire axial direction outer side between adjacent shoulder lug grooves in the tire circumferential direction and has an outer end terminated without reaching a respective one of the tread edges, the plurality of shoulder ribs is formed such that the shoulder lug grooves and the shoulder sipes are formed alternately with respect to each other and that a tire circumferential direction length of a first region between an inner end of each of the shoulder sipes and an inner end of an adjacent shoulder lug groove is in a range of 2 times to 4 times a tire circumferential direction length of a second region between the inner end of each of the shoulder sipes and an inner end of the other adjacent shoulder lug groove, and the plurality of shoulder ribs is formed such that a distance between the inner end of each of the shoulder lug grooves and the shoulder main groove is in a range of 7% to 12% of a width of each of the shoulder ribs.

8. The pneumatic tire according to claim 7, wherein the plurality of shoulder ribs is formed such that each of the shoulder sipes has a tire axial direction length in a range of 20% to 50% of the width of each of the shoulder ribs.

9. The pneumatic tire according to claim 7, wherein the plurality of shoulder ribs is formed such that each of the shoulder lug grooves has an axial-direction portion extending along a tire axial direction, and an inclined portion inclined in one direction with respect to the tire axial direction.

10. The pneumatic tire according to claim 9, wherein the plurality of shoulder ribs is formed such that each of the shoulder sipes is inclined in the same direction as the inclined portion with respect to the tire axial direction, and that a difference between an angle of each of the shoulder sipes with respect to the tire axial direction and an angle of the inclined portion with respect to the tire axial direction is 10 degrees or less.

11. The pneumatic tire according to claim 9, wherein the plurality of land portions includes a plurality of middle ribs formed on tire axial direction inner sides of the shoulder main grooves, respectively, such that each of the middle ribs has a plurality of middle sipes extending from a respective one of the shoulder main grooves to a tire axial direction inner side, and the plurality of middle sipes is formed such that each of the middle sipes has an inner end terminated in a respect one of the middle ribs and is inclined in the same direction as the inclined portion with respect to the tire axial direction, and that a difference between an angle of each of the middle sipes with respect to the tire axial direction and the angle of the inclined portion with respect to the tire axial direction is 10 degrees or less.

12. The pneumatic tire according to claim 11, wherein the plurality of middle ribs is formed such that the middle sipes are positioned on extension lines of the inclined portions, respectively.

13. The pneumatic tire according to claim 9, wherein the plurality of shoulder ribs is formed such that each of the shoulder lug grooves has a tire axial direction length of the axial-direction portion in a range of 55% to 65% of the width of each of the shoulder ribs.

14. A pneumatic tire, comprising:
a tread having a plurality of main grooves extending in a tire circumferential direction, and a plurality of land portions partitioned by the main grooves,
wherein the plurality of main grooves includes a pair of shoulder main grooves formed on tread edge sides, respectively, the plurality of land portions includes a pair of shoulder ribs formed between the shoulder main grooves and tread edges, respectively, each of the shoulder ribs has a plurality of shoulder lug grooves formed such that each of the shoulder lug grooves is extending from a respective one of the tread edges to a tire axial direction inner side and has an inner end terminated without reaching a respective one of the shoulder main grooves, and a plurality of shoulder sipes formed such that each of the shoulder sipes is extending from a respective one of the shoulder main grooves to a tire axial direction outer side between adjacent shoulder lug grooves in the tire circumferential direction and has an outer end terminated without reaching a respective one of the tread edges, the plurality of shoulder ribs is formed such that the shoulder lug grooves and the shoulder sipes are formed alternately with respect to each other and that a tire circumferential direction length of a first region between an inner end of each of the shoulder sipes and an inner end of an adjacent shoulder lug groove is in a range of 2 times to 4 times a tire circumferential direction length of a second region between the inner end of each of the shoulder sipes and an inner end of the other adjacent shoulder lug groove, and the plurality of shoulder ribs is formed such that each of the shoulder lug grooves has an axial-direction portion extending along a tire axial direction, and an inclined portion inclined in one direction with respect to the tire axial direction and that each of the shoulder sipes has a tire axial direction length that is smaller than a tire axial direction length of the inclined portion of the shoulder lug grooves.

15. The pneumatic tire according to claim 14, wherein the plurality of shoulder ribs is formed such that each of the shoulder sipes has the tire axial direction length in a range of 20% to 50% of a width of each of the shoulder ribs.

16. The pneumatic tire according to claim 14, wherein the plurality of shoulder ribs is formed such that each of the shoulder sipes is inclined in the same direction as the inclined portion with respect to the tire axial direction, and that a difference between an angle of each of the shoulder sipes with respect to the tire axial direction and an angle of the inclined portion with respect to the tire axial direction is 10 degrees or less.

17. The pneumatic tire according to claim 14, wherein the plurality of land portions includes a plurality of middle ribs formed on tire axial direction inner sides of the shoulder main grooves, respectively, such that each of the middle ribs has a plurality of middle sipes extending from a respective one of the shoulder main grooves to a tire axial direction inner side, and the plurality of middle sipes is formed such that each of the middle sipes has an inner end terminated in a respect one of the middle ribs and is inclined in the same direction as the inclined portion with respect to the tire axial direction, and that a difference between an angle of each of the middle sipes with respect to the tire axial direction and the angle of the inclined portion with respect to the tire axial direction is 10 degrees or less.

18. The pneumatic tire according to claim 17, wherein the plurality of middle ribs is formed such that the middle sipes are positioned on extension lines of the inclined portions, respectively.

19. The pneumatic tire according to claim 14, wherein the plurality of shoulder ribs is formed such that each of the shoulder lug grooves has a tire axial direction length of the axial-direction portion in a range of 55% to 65% of a width of each of the shoulder ribs.

20. The pneumatic tire according to claim 14, wherein the plurality of shoulder ribs is formed such that a distance between the inner end of each of the shoulder lug grooves and the shoulder main groove is in a range of 7% to 12% of a width of each of the shoulder ribs.

* * * * *